M. A. KENDALL.
BUCKET CONVEYER.
APPLICATION FILED AUG. 10, 1911.
1,090,156. Patented Mar. 17, 1914.
2 SHEETS—SHEET 1.
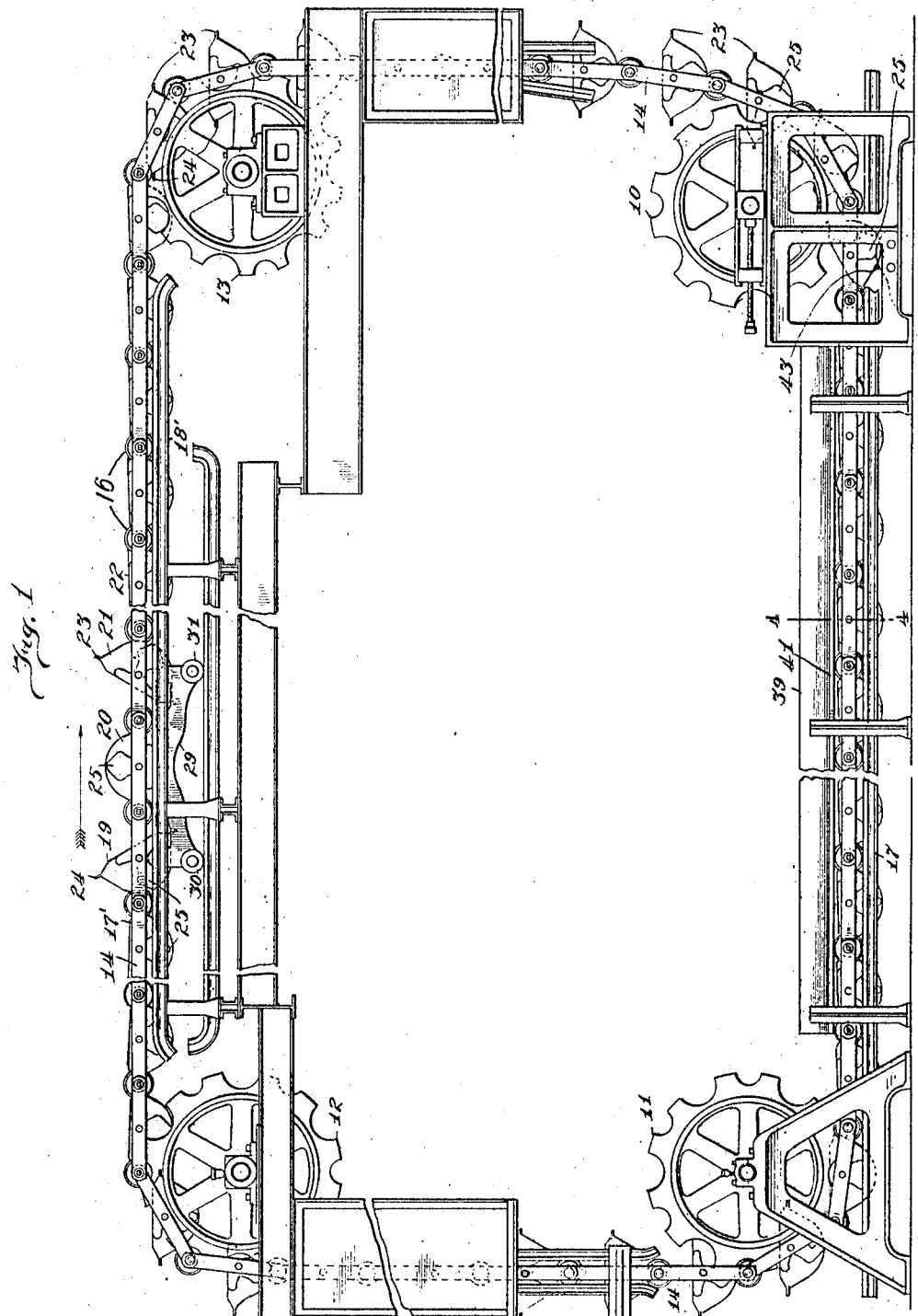

M. A. KENDALL.
BUCKET CONVEYER.
APPLICATION FILED AUG. 10, 1911.
1,090,156.
Patented Mar. 17, 1914.
2 SHEETS—SHEET 2.
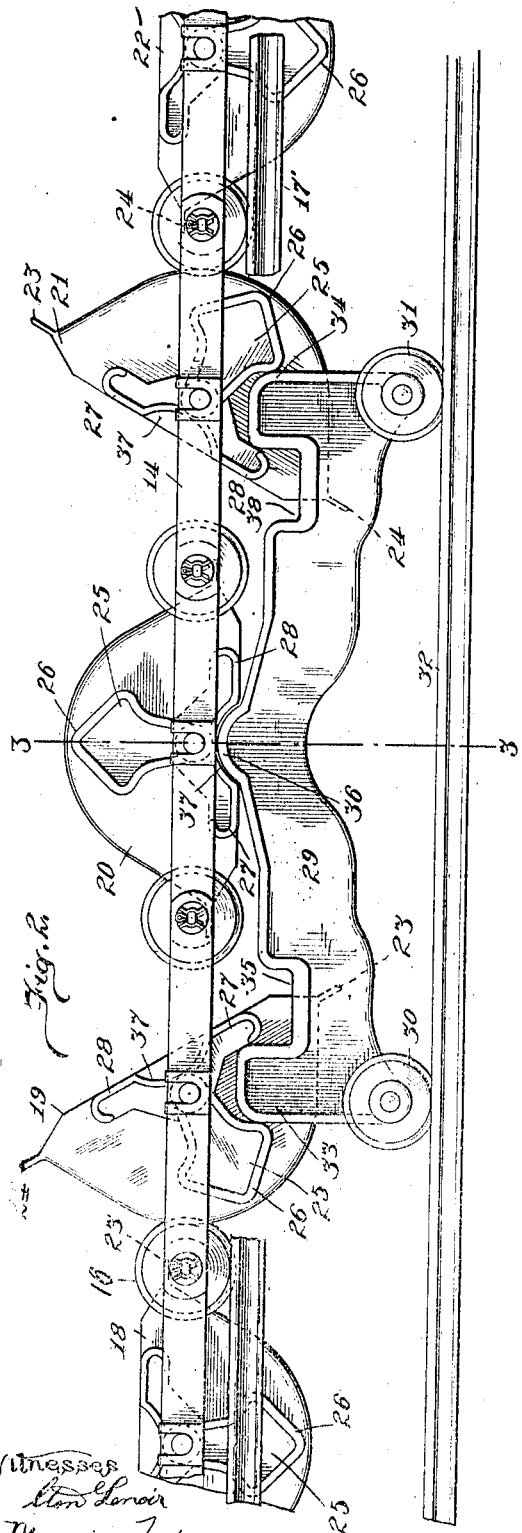
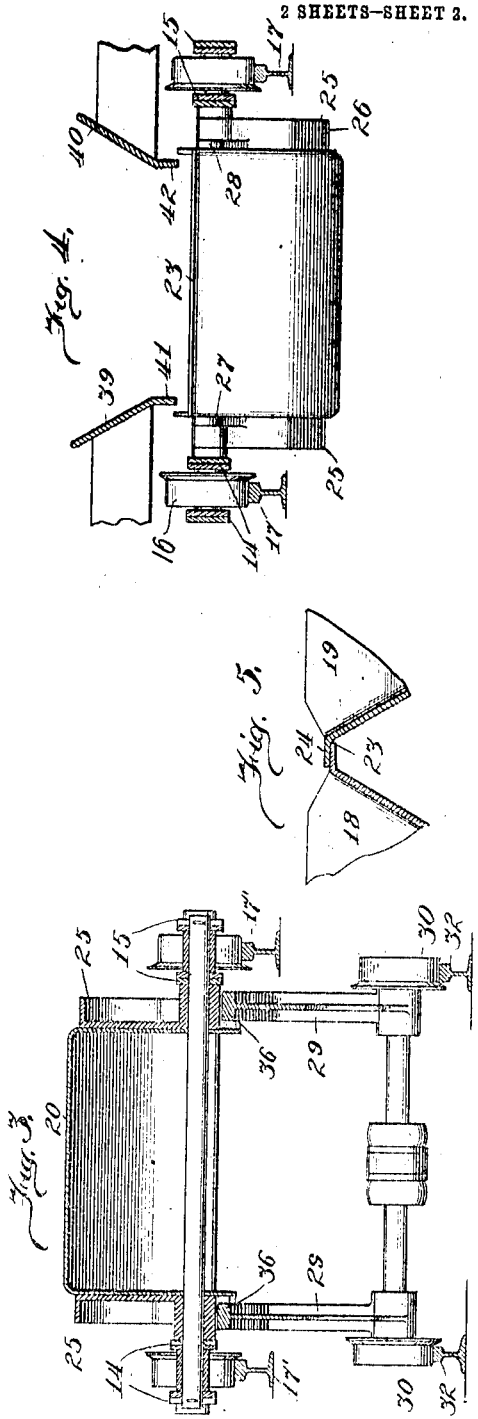
Inventor
Myron A. Kendall,
Gilson & Gilson
Attorneys
Witnesses

UNITED STATES PATENT OFFICE.

MYRON A. KENDALL, OF AURORA, ILLINOIS, ASSIGNOR TO STEPHENS-ADAMSON MFG. CO., A CORPORATION OF ILLINOIS.

BUCKET CONVEYER.

1,090,156.  Specification of Letters Patent.  Patented Mar. 17, 1914.

Application filed August 10, 1911. Serial No. 643,358.

*To all whom it may concern:*

Be it known that I, MYRON A. KENDALL, a citizen of the United States, and resident of Aurora, county of Kane, and State of Illinois, have invented certain new and useful Improvements in Bucket Conveyers, of which the following is a specification, and which are illustrated in the accompanying drawings, forming a part thereof.

The invention relates to conveyers which comprise a pair of sprocket chains between which are pivotally carried a series of buckets, a tripper being provided for turning the buckets for the purpose of discharging them of their contents.

The objects of the invention are to provide means for completely overturning or rotating the buckets for the purpose of discharge; to provide for such tripping operation when the conveyer is driven in either direction; and to provide improved means for preventing the tilting of the buckets as they are filled. These objects are attained in the structure hereinafter described and which is illustrated in the accompanying drawings in which—

Figure 1 is a detail side elevation of the conveyer. Fig. 2 is a detail side elevation thereof, some of the parts being omitted, drawn to a larger scale, and showing the tripper and the manner of its operation. Fig. 3 is a transverse sectional detail on the line 3—3 of Fig. 2. Fig. 4 is a transverse sectional detail on the line 4—4 of Fig. 1, and Fig. 5 is a longitudinal sectional detail through a portion of a pair of buckets.

The conveyer is shown as adapted to receive material at one level and discharge it at a higher level, there being provided a succession of sprocket wheels designated by the numerals 10, 11, 12 and 13 which are mounted upon suitable supports and are arranged in the form of a parallelogram. In practice it will be understood that these sprocket wheels are mounted in pairs but in the drawings only one member of each pair is shown. Mounted upon these sprocket wheels are a pair of chains 14, 15, each chain comprising a succession of links pivotally united, the pivots carrying flanged wheels 16 which run upon lower and upper horizontal tracks 17, 17′ and are engaged by the several sprocket wheels. A succession of buckets as 18, 19, 20, 21 and 22 are carried by the two chain being pivotally attached to the links thereof, preferably intermediate of their ends, each bucket being provided with longitudinally projecting lips 23, 24, one at each end, the lips of adjacent buckets overlapping.

As thus far described the apparatus conforms to common practice. The buckets are of considerable weight and their pivots or gudgeons are so disposed that they are maintained in proper or upright position by gravity. As the buckets are transferred from the ascending stretch of the chains to the upper horizontal stretch their forward lips naturally take the position below the rearward lips of the next preceding bucket. Heretofore it has been the practice to discharge the buckets of their contents by tilting them, the bucket being permitted to swing back into normal position when empty, thus bringing its forward lip again in contact with the lower face of the rearward lip of the next preceding bucket. As a consequence as each bucket starts on its descent it must disengage itself from the next bucket in the rear and as a result both buckets are caused to swing. In consequence of the very considerable weight of the buckets there results a disagreeable clanging and frequently considerable damage to the parts. As the buckets receive their loads as they travel along the lower horizontal stretch of the chains they are apt to be tilted and permit the material to drop between them particularly when it contains heavy blocks. To overcome the former of these difficulties I provide an improved form of tripper mechanism whereby the bucket is completely overturned or rotated in the discharging action, thereby more effectually discharging it of its contents and bringing its forward lip above the rearward lip of the next bucket in advance. When thus arranged the descending bucket leaves the following bucket without any interference whatever. To this end there is fixed to each end of each bucket a tripping cam generally designated by the numeral 25 and being provided with a depending arm 26 and two laterally projecting arms 27, 28 at its upper end. The tripper is in the form of a carriage 29 having supporting wheels 30, 31 which run upon the track 32, thus permitting it to be shifted to any desired position along the upper horizontal stretch of the sprocket chains. The two side rails of the tripper 29 are alike and are provided at each end with upstanding lugs 33, 34 of sufficient height to engage the depending arm 26 of the tripper cam but being below the normal position of the lateral arms 27, 28. As the depending arm of the tripper cam engages the upstanding lug of the tripper the bucket is tilted forward, the arm 27 of its tripper cam entering a recess 35 formed in the upper face of the side rail of the tripper 29. The continued advance of the bucket causes it to be turned upside down by the reason of the engagement of the arm 27 with the recess 35 and its rotation is continued by the engagement of a central upstanding lug 36 formed on the side rail of the tripper carriage with a central recess 37 in the upper face of the tripper cam. The bucket now tends naturally to right itself by completing its rotation but is held against violent action by the engagement of the lateral arm 28 of the tripper cam with the upper face of the side rail of the tripper, this arm entering a recess 38 at the opposite end of the tripper and corresponding with the recess 35, the cam arm 26 sliding over the lug 34. By this overturning action the advance lug 23 of the bucket falls on top of the rearward lug 34 of the bucket next in advance.

The two ends of the side rails of the tripper 29 being alike in construction the buckets may be driven in either direction and discharged in the same manner.

The difficulty arising from the tilting of the buckets as they are loaded is overcome in the present instance by flanging the walls 39, 40 of the feed hopper downwardly, as shown at 41, 42 so that they come into close proximity with the tops of the buckets as the latter receive their load.

As each of the buckets enters up on the lower horizontal stretch of the chains its forward lip naturally locates itself above the rearward lip of the next preceding bucket. As this would cause an interference, as each bucket starts upon its upward travel after being loaded it is advisable to readjust their relative relations so as to bring the forward lip of each below the rearward lip of the next bucket in advance, before filling. This is accomplished by locating a trip 43 at the commencement of the lower horizontal stretch of the chains for engaging the depending arm 26 of the cam trips 25 and slightly tilting the buckets forwardly. No claim, however, is made for this feature as it is not of my invention.

The conveyer may be driven and the tripper 29 shifted and locked in place by any suitable means. As devices for this purpose are well known and in common use they are not shown in the drawings.

I claim as my invention—

1. In a bucket conveyer, in combination, a pair of sprocket chains, sprocket wheels for carrying such chains, buckets pivotally attached to such chains, a tripper cam fixed to each bucket and having a depending and a forwardly projecting arm, a tripper for engaging such arms in succession for causing a complete rotation of the buckets on their pivots.

2. In a bucket conveyer, in combination, a pair of sprocket chains, sprocket wheels for carrying such chains, buckets pivotally attached to such chains, a tripper cam fixed to each bucket and having a depending and a forwardly and a rearwardly projecting arm, a tripper for engaging such arms in succession for causing a complete rotation of the buckets on their pivots.

3. In a bucket conveyer, in combination, a pair of sprocket chains, sprocket wheels for carrying such chains, buckets pivotally attached to such chains, a tripper having a longitudinal rail provided with upstanding lugs adjacent its ends and midway thereof and recesses adjacent each of the end lugs, and a tripper cam fixed to each bucket and having a depending arm and forwardly and rearwardly projecting arms and a recess intermediate of the last two arms.

4. In a conveyer, in combination, a series of connected rotatable buckets having overlapping lips, and means for adjusting the buckets to reverse the relative positions of the overlapping lips acting to turn the buckets in one direction only.

5. In a conveyer, in combination, a series of connected rotatable buckets having overlapping lips, and means for causing a complete rotation of each bucket, the action of said rotating means upon the several buckets being so timed that when each bucket is inverted the two adjacent buckets are tilted whereby the overlapping lips clear.

MYRON A. KENDALL.

Witnesses:
C. A. KRAUSE,
E. P. CALKINS.